June 25, 1935.   R. SCHMIDT   2,005,847
SOUND FILM
Filed Jan. 28, 1933 sound track in form of a zigzag groove lenticular film

Inventor:
Richard Schmidt,
By Philip S. Hopkins,
Attorney.

Patented June 25, 1935

2,005,847

UNITED STATES PATENT OFFICE 2,005,847

SOUND FILM

Richard Schmidt, Dessau in Anhalt, Germany, assignor to Agfa Ansco Corporation, Binghamton, N. Y., a corporation of New York Application January 28, 1933, Serial No. 654,089
In Germany January 30, 1932

2 Claims. (Cl. 274—43)

My present invention relates to sound recording and more particularly to sound recording on lenticular film.

In order to provide a lenticular cinematograph film with a sound track produced mechanically, it has hitherto been the practice to provide first a plane track either by planing the lenticular surface of the film in the required breadth or by pressing the film with a hot roller of the required breadth; or a smooth strip of film has been left in the operation of producing the lenticular elements on the film. Another method consists in making the sound track on that face of the film which does not carry the lenticular elements, the gelatin having been removed for the purpose, or omitted in the manufacture.

According to this invention I have found that sounds can be recorded mechanically on a lenticular film by means of a stylus and cutting the lenticular elements so that the sound groove forms a zigzag line, that is to say there is no preparation of the film or particular mode of making the film, to fit it for receiving the sound track. It has been found that the lenticular elements do not impair the process of recording sound mechanically in form of a zigzag line and that the reproduction of the sound record thus produced is not disturbed by extraneous noises.

As according to my invention any lenticular film is applicable for receiving sound records mechanically the invention is a considerable improvement especially in connection with colored sound films made by the well-known Berthon process as disclosed in U. S. Patent No. 992,151, granted May 16, 1911.

In the accompanying drawing there is illustrated a lenticular film bearing a sound groove according to this invention.

Figure 1:
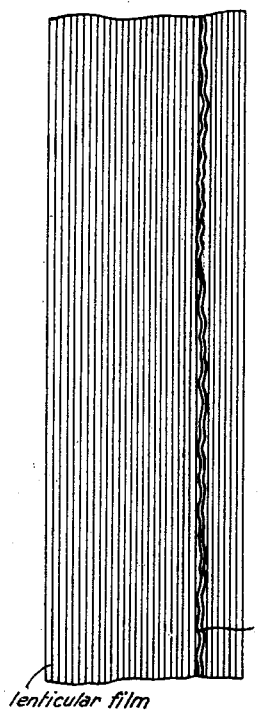
Fig. 1 shows the face of the film which is provided with the lenticular elements and the zigzag sound groove.
Figure 2:
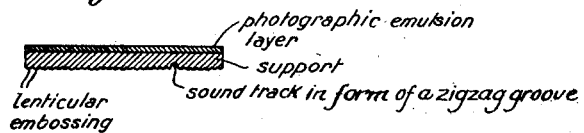
Fig. 2 shows a section through a lenticular film and the emulsion layer, the support being embossed with the lenticular elements and the sound groove being engraved on this embossed surface.

What I claim is:

1. A lenticular film bearing a mechanical sound track in form of a zigzag sound groove within the lenticular elements.

2. A lenticular film bearing a mechanical sound track in form of a zigzag sound groove within the lenticular elements the sound groove in general being parallel with the lenticular elements.

RICHARD SCHMIDT.